US007729017B2

(12) United States Patent
Owens et al.

(10) Patent No.: US 7,729,017 B2
(45) Date of Patent: Jun. 1, 2010

(54) SCANNING DEVICE AND METHOD FOR SCANNING

(75) Inventors: Brian Keith Owens, Lexington, KY (US); William Chad Wedding, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1522 days.

(21) Appl. No.: 10/842,819

(22) Filed: May 11, 2004

(65) Prior Publication Data

US 2005/0254104 A1 Nov. 17, 2005

(51) Int. Cl.
*H04N 1/04* (2006.01)

(52) U.S. Cl. ...................................... 358/474; 358/475

(58) Field of Classification Search ................. 358/474, 358/473, 475, 480, 482, 486, 487, 492, 493, 358/494, 497, 498
See application file for complete search history.

(56) References Cited

U.S. PATENT DOCUMENTS 4,063,096 A * 12/1977 Roberts ...................... 250/343
4,894,723 A * 1/1990 Takaiwa .................. 348/230.1
5,153,745 A 10/1992 Brandkamp et al.
5,336,976 A 8/1994 Webb et al.
5,495,329 A 2/1996 Anderson, II et al.
5,589,905 A * 12/1996 McIntyre .................... 396/431
5,654,809 A 8/1997 Beeman et al.
5,684,610 A 11/1997 Brandestini et al.
5,907,742 A 5/1999 Johnson et al.
5,914,871 A 6/1999 Lin et al.
5,966,074 A * 10/1999 Baxter ........................ 340/565
6,028,681 A 2/2000 Gray et al.
6,044,180 A 3/2000 Brandestini et al.
6,316,767 B1 11/2001 Paxton et al.
6,323,966 B1 11/2001 DeCaro et al.
6,433,895 B1 8/2002 Hansen
6,614,564 B1 * 9/2003 Sakaguchi .................. 358/487
7,064,872 B1 * 6/2006 Jeran .......................... 358/475
7,072,527 B1 * 7/2006 Nako .......................... 382/290
2002/0140996 A1 10/2002 Spears et al.
2002/0171819 A1 11/2002 Cheung
2002/0196418 A1 * 12/2002 Hagiwara et al. ............. 355/67
2003/0012107 A1 * 1/2003 Fukui et al. .............. 369/53.25
2003/0129507 A1 * 7/2003 Tashiro et al. ................. 430/21
2004/0044173 A1 * 3/2004 Fujimori et al. .......... 528/308.1

* cited by examiner

*Primary Examiner*—Jerome Grant, II

(57) ABSTRACT

A scanning device including a controller and a light source operatively coupled to the controller. The light source is shaped and located such that at least part of the light emitted from the light source is reflected off of a document to be scanned, and the light source has a maximum output when the light source is fully warmed up. The scanning device further includes a receptor operatively coupled to the controller, the receptor being located to receive the light reflected from the document to be scanned such that the at least part of the visual properties of the document to be scanned are transmitted to the receptor in a scanning process. The controller is configured to selectively allow the scanning process to proceed when an output of the light source is less than about 80% of the maximum output.

40 Claims, 3 Drawing Sheets

SCANNING DEVICE AND METHOD FOR SCANNING

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention is directed to a scanning device, and more particularly, to a scanning device which can scan a document with relatively short warm up time.

2. Description of the Related Art

Optical scanning devices, or devices which include optical scanning components, are widely used by businesses and personal users for scanning and transmitting documents and other information. Such scanning devices may electronically or optically scan the document. The scanning device may then provide a copy in the manner of a standard copier, or provide an electronic version of the document that can be further processed or manipulated. For example, the electronic version of the scanned document may be printed, sent via a facsimile transmission, exported or sent to a network or computer, etc.

Many existing scanning devices utilize a lamp to direct light at the document to be scanned, and the light reflected by the document is then utilized to create a scan or copy of the document. However, most lamps, when not having been used for a period of time, require a warm-up time until the lamp reaches a state at which the lamp can provide an output sufficient to provide scans or copies. Thus, in many scanning devices, when the lamp is cold or is not sufficiently warmed up, a user must wait for the lamp to warm up before making a scan or copy. The warm up time can last from several seconds up to several minutes, which results in wasted time. Many prior art attempts to address this issue have focused upon speeding up the warm up time of the lamp, which has proved to be unsatisfactory.

Accordingly, there is a need for a scanning device which can provide scans or copies while reducing any waiting time for the lamp to warm up.

SUMMARY

In one embodiment, the invention is a scanning device which can provide scans or copies while reducing waiting time for the lamp or light source to warm up. In particular, the inventors of this application have discovered that users of scanning devices often want a scan or copy as quick as possible without regard for the quality of the scan or copy. For example, the inventors have discovered that users may often want a copy which simply provides the rough outline of the document, or which illustrates the orientation of the original document so that the orientation of the original can be adjusted for subsequent copies, or in which quality of the copy or scan is of relatively low importance. Accordingly, in one embodiment, the present invention is a scanning device in which a scan or copy proceeds with a relatively low output from the lamp or light source. In another embodiment, the relatively low output of the light source is accommodated by adjusting the scanning speed. In another embodiment, the relatively low output of a light source is accommodated by adjusting the output of a receptor.

In one embodiment, the invention is a scanning device including a controller and a light source operatively coupled to the controller. The light source is shaped and located such that at least part of the light emitted from the light source is reflected off of a document to be scanned, and the light source has a maximum output when the light source is fully warmed up. The scanning device further includes a receptor operatively coupled to the controller, the receptor being located to receive the light reflected from the document to be scanned such that the at least part of the visual properties of the document to be scanned are transmitted to the receptor in a scanning process. The controller is configured to selectively allow the scanning process to proceed when an output of the light source is less than about 80% of the maximum output.

In another embodiment, the invention is a scanning device including a controller and a light source operatively coupled to the controller. The light source is shaped and located such that at least part of the light emitted from the light source is reflected off of a document to be scanned. The scanning device further includes a receptor operatively coupled to the controller, the receptor being located to receive the light reflected from the document to be scanned such that the at least part of the visual properties of the document to be scanned are transmitted to the receptor in a scanning process. The controller is configured to determine the output of the light source based at least in part upon the elapsed warm up time of the light source.

In yet another embodiment the invention is a scanning device including a controller and a light source operatively coupled to the controller. The light source is shaped and located such that at least part of the light emitted from the light source is reflected off of a document to be scanned. The scanning device further includes a receptor operatively coupled to the controller, the receptor being located to receive the light reflected from the document to be scanned such that the at least part of the visual properties of the document to be scanned are transmitted to the receptor when there is relative movement between the light source and the document in a scanning process. The controller is configured to determine the output of the light source and to control the speed of the relative movement between the light source and the document during the scanning process based at least in part upon the output of the light source.

The present invention is more fully described in the following description and the accompanying drawings.

DETAILED DESCRIPTION

Figure 1:
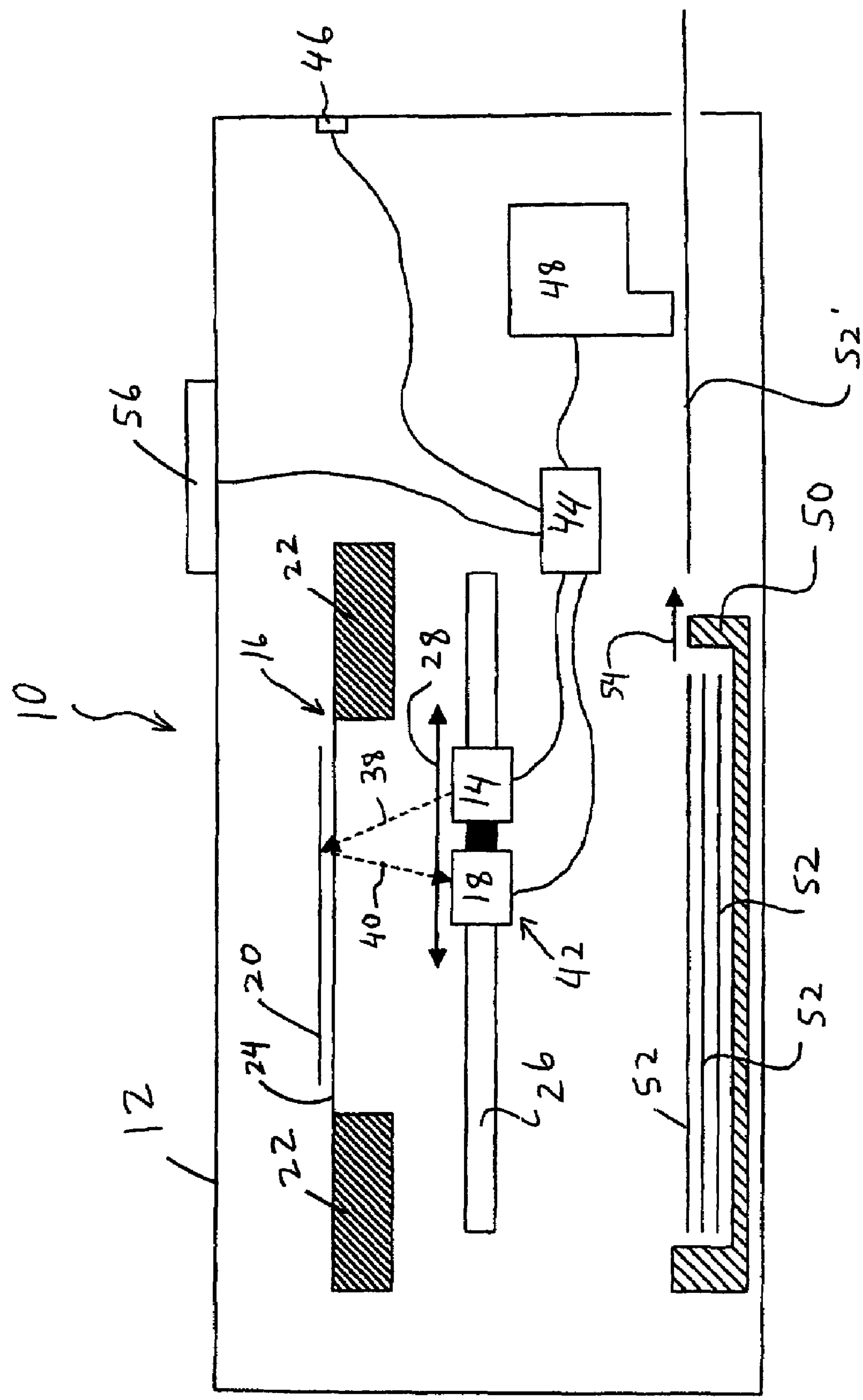
FIG. 1 is a schematic view of a scanning device according to one embodiment of the invention.
Figure 2:
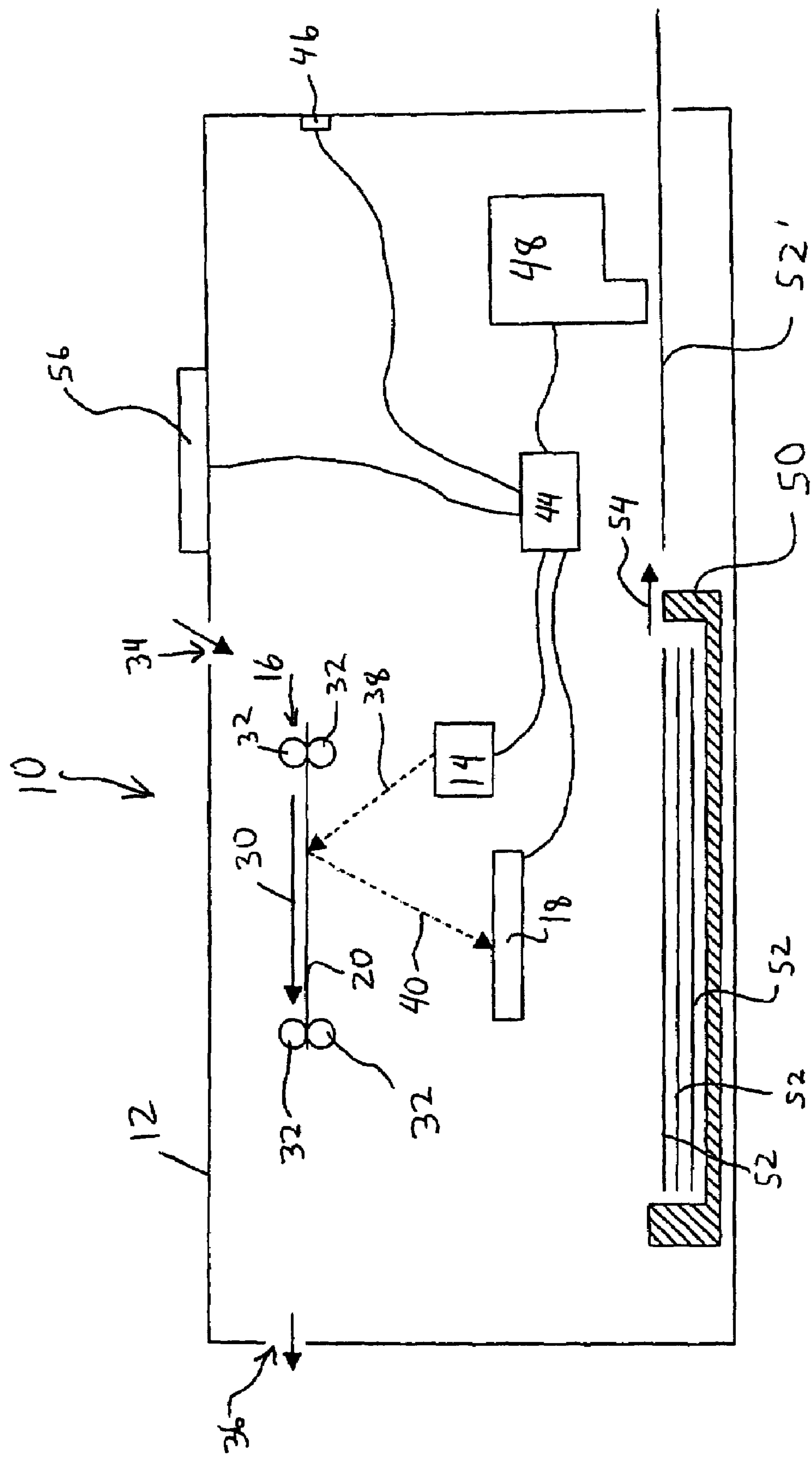
FIG. 2 is a schematic view of another scanning device according to another embodiment of the invention.

As shown in FIGS. 1 and 2, the scanning device of the present invention, generally designated 10, may include a housing 12 which may house, store and/or support components of the scanning device 10. The scanning device 10 may include a light source 14, a document-receiving portion 16 and a receptor 18. The light source 14 may be or include a lamp or bulb, or a plurality of lamps or bulbs, including but not limited to cold cathode fluorescent lamps, xenon lamps, fluorescent lamps or incandescent bulbs. The document-receiving portion 16 is shaped and configured to receive a document to be scanned 20 thereon such that light from the light source 14 may be directed onto the document 20.

In FIG. 1 the scanning device 10 is a flat bed scanner, in which case the document-receiving portion 16 is a platen having supporting platen edges 22 and a piece of transparent material 24 (e.g., glass or plastic) supported by the platen edges. In this case the light source 14 and receptor 18 are slidably mounted to a guide or stabilizer bar 26 such that the light source 14 and receptor 18 are reciprocally movable along the length of the document to be scanned 20, as indicated by double-ended arrow 28.

FIG. 2 illustrates an embodiment wherein the scanning device 10 is a sheet fed scanner, in which case the light source 14 and receptor 18 are fixed and the document 20 is movable relative to the light source 14 and receptor 18, as indicated by arrow 30. The scanning device 10 of FIG. 2 may include sets of rollers 32 to guide the document along a document feed path, in which case the rollers 32 may be considered to be or be part of the document-receiving portion 16. In particular, the document 20 may be fed into the housing 10 via a document inlet 34, through the nips of the rollers 32 and then be passed through a document outlet 36 after scanning and received in a tray not shown.

As shown in FIGS. 1 and 2, light 38 emitted from the light source 14 may impinge upon the document to be scanned 20, and the reflected light 40 is then directed toward and received on the receptor 18 such that said at least part of the visual properties of the document 20 are transmitted to the receptor 18. For simplicity, FIGS. 1 and 2 illustrate the light 38, 40 as traveling directly from the light source 14 to the document 20, and directly from the document 20 to the receptor 18. However, it should be understood that the light 38, 40 may be reflected along various paths by mirrors, and could also pass through various lenses, filters and the like which are not shown in the drawings. The scanning device 10 may be configured to scan in color, in which case the scanning device 10 may include various color filters to process the reflected light 40 or colored light sources can be used, such as a red, blue, or green light sources.

In one embodiment, the receptor 18 is configured to electronically process the reflected light, for example to create an electronic version of the document to be scanned 20. Thus, the receptor 18 may be able to determine visual properties of the document 20 and generate an output, such as data or a data signal corresponding to the visual properties of the document 20. The receptor 18 may be a charge coupled device ("CCD") array which includes a collection of light sensitive diodes that convert photons (light) into an electrical charge. In the embodiment of FIG. 1, the receptor 18 is coupled to the light source 14 for movement along the guide 26, such that the light source 14 and receptor 18 (as well as any filters, lens, mirrors, etc.) make up a scan head 42 that is movable as indicated by the double-ended arrow 28. In the embodiment of FIG. 2, the document 20 is movable relative to the receptor 18 and light source 14. Furthermore, if desired, the document 20 and scan head 42 may both be movable.

The receptor 18 and the light source 14 may each be operatively coupled to a controller processor, chip, central processing unit, computer, circuit or various other hardware and/or software or the like (collectively termed a "controller" 44). The controller 44 may control the light emitted from the light source 14. The output of the receptor 18 may be transmitted to the controller 44 such that the output of the receptor 18 (i.e., the electronic copy of the document 20) may be able to be processed by and/or stored in the controller 44. The controller 44 may also be able to control the relative movement between the light source 14/receptor 18 and the document 20. The controller 44 may include or be coupled to a memory means or memory, which can include a hard drive, ROM, RAM, or other memory devices.

The scanning device 10 may also include data port 46 (such as a data modem, parallel port, small computer system interface ("SCSI"), universal serial bus ("USB"), firewire connection, etc.) such that external devices (such as a computer or network) can be coupled to the data port and thereby to the scanning device 10. The controller 44 may be operatively coupled to the data port 46 such that the controller 44 can be operatively coupled to, transmit data to or receive data from the external device coupled to the data port 46. For example, the controller 44 may assemble, manipulate, or process the output of the receptor 18 to create an electronic version of the document 20. The electronic version of the document 20 may then be able to be transmitted to an external device (i.e. computer or network) via the data port 46 so that the computer can process the electronic version of the document 20. Such processing may include, for example, providing a snapshot of the scanned document 20 (for example in ADOBE ACROBAT® (format), performing optical character recognition, modifying or transferring the electronic version of the scanned document using a word processor or the like, etc.

The electronic version of the document can be an electronic file which can be edited by software or a computer or stored in electronic form. However, the electronic version of the document may also or instead be created by the receptor 18, or by some other component. The output of the receptor 18, and/or the electronic version of the scanned document may be stored in the controller 44 or elsewhere in the scanning device 10. The data port 46 may also be able to interface with a telecommunications line, computer, or network and can function as an incoming facsimile processing means and/or an outgoing facsimile processing means.

The scanning device 10 may include a print head 48 (i.e. an inkjet head, a laser-printing head, ribbon printing head or the like) or other print means to print bitmap data, print data and/or other data. The print head 48 is operatively coupled to the controller 44 and may be able to print documents, text, photos, drawings, etc. onto various media in response to command, data and print information sent to the controller 44 and/or print head 48. The command, data and print information provided to the print head 48 may be sent from a variety of devices or components, including from the receptor 18 or from an external device coupled to the scanning device 10 via the data port 46. The controller 44 may be configured to receive, process, rasterize, organize, store etc. various print jobs and supply the print jobs to the print head 48.

When the print job is provided to the print head 48 from the receptor 18, the electronic version of the document (i.e. the output of the receptor 18) may be directly transferred to the print head 48 (or transmitted to the print head 48 via the controller 44) so that the print head 48 can print the electronic version of the document onto the print medium. The scanning device 10 may include a paper or media tray 50 which stores paper or media 52 to be printed upon. In order to print, a piece of media 52' is picked from the tray 50 and sent to a location adjacent to the print head 48 (as indicated by arrow 54) so that the print head 48 can print upon the media 52'.

The scanning device 10 may include an interactive graphical display unit ("GDU"), input unit, or graphical user interface ("GUI") 56 which can receive information and data and can visually display information, data, documents, text, etc. The GUI 56 may include a display screen or display area such as a monitor, LCD display, or the like. The GUI 56 may also be able to receive inputs from a user. For example, the GUI 56 may operate as a touch pad or include a standard numerical or alphanumeric keypad which can also receive inputs from a user. The GUI 56 may be located on, or integrated into, the housing 12 and may be coupled to the controller 44 so that inputs from a user can be sent to the controller 44 or other components via the GUI 56.

Rather than operating as an optical scanner which creates an electronic version of the document, the receptor 18 may be a photoconductive body, such as a photoconductive drum, photoconductive belt or the like so that the scanning device 10 operates as photocopier. In this case an analog version or copy of the document 20 (or part of the document) is created on the receptor 18. The analog (latent) copy of the document 20 may then be transferred from the receptor 18 to a sheet of media (such as paper) through the use of toner and electrostatic charges to create an analog copy in a well-known manner. In this case the paper 52 may be transferred from the storage tray 50 and directed adjacent the receptor 18 for transfer of toner image to the paper 52 to create a copy.

Figure 3:
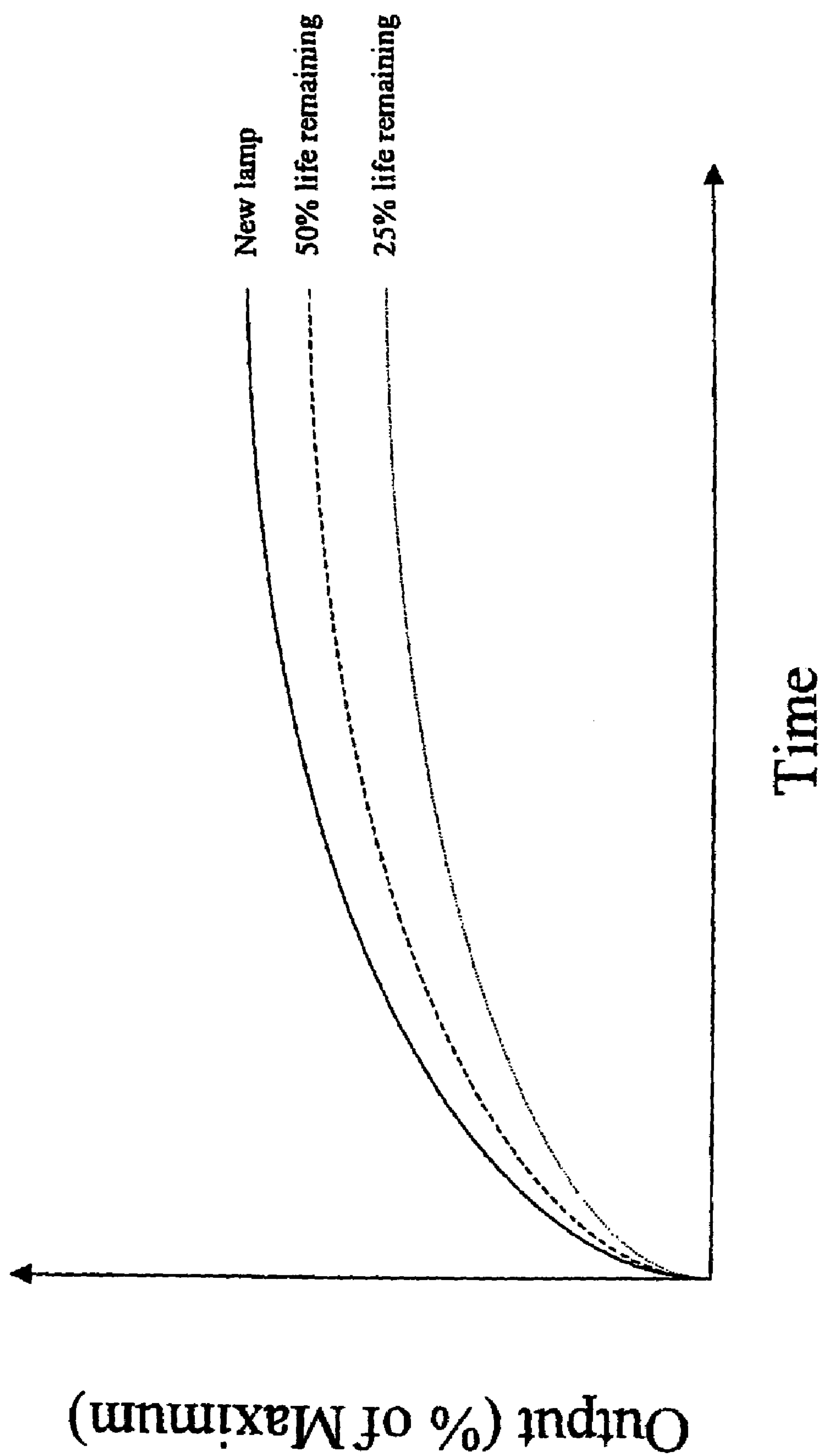
FIG. 3 is an example of a plot of output versus time for a light source used in a scanning device.

When a light source 14 has remained inactivated (off) for a sufficient period of time, the initial output of the light source 14 is typically relatively low and the light source 14 is relatively cold. Upon activation of the light source 14, it will gradually warm up and its output increases with time, as shown in FIG. 3. Further, besides variance in the magnitude of light, during the warm-up time the spectrum of light emitted by the light source 14 may vary. Thus, most light sources 14 have a known output performance curve wherein the output of the light source 14 as a function of time when starting from a cold state is plotted. In order to provide scans of a sufficient quality, most existing scanning devices track the output of the light source and prevent any scanning from occurring until the output of the light source reaches a sufficient level. For many existing light sources a warmup time of 20-30 seconds is required before the light source is considered to be usable, and the light source 14 may reach its maximum output after about 1-2 minutes.

The light source 14 may have a "maximum" output or a "stable" output, and for the purposes of this application the terms are considered to be interchangeable. For example, the output of the light source may be a curve which approaches a maximum value with increasing time. When the output of the light source does not change, or changes very little with respect to time, then the light source may be considered to be at its maximum or stable output level. For example, in one case when the magnitude and/or spectrum of the output of the light source changes by about 1% or less over a ten second period then the light source may be considered to be at its maximum or stable output level. The light source may also or instead be considered to be at its maximum or stable output level when the light source has been on for a predetermined period of time, for example, 5 minutes.

In the present invention, the scanning may be permitted (i.e. by the controller 44) to proceed when the output of the light source 14 is relatively low. For example, scanning may be permitted when the output of the light source is less than about 80%, or less than about 70%, or less than about 60%, or less than about 50% of the maximum output of the light source 14. In this case, the quality of the resultant scan may be of lesser quality, but the scan can be provided relatively quickly because a user does not need to wait for the light source 14 to fully warm up.

In one embodiment, the controller 44 inserts a time delay and thereby prohibits scanning from occurring unless a certain minimum output of the light source is reached, for example at least about 50%, or at least about 60%, or at least about 70%, or at least about 80% of the maximum output of the light source 14. The delay time will vary based upon the specific scan application and the light source 14. Thus, rather than waiting 20-30 seconds until the light source 14 reaches a certain level, the user may only have to wait, for example, about 5-10 seconds. The "maximum light output" as used in this context is the maximum output for the light source 14 taking into account the degradation or gradual loss in output of the light source 14 over time, as will be discussed in greater detail below.

On certain occasions the speed of a scan may be desired over the quality of the scan which is accommodated by the present invention. For example, the inventors have discovered that users may often want a copy which simply provides the rough outline of the document 20, or which illustrates the orientation of the original document so that the orientation of the original can be adjusted for subsequent copies, or in which quality of the copy or scan is of relatively low importance. The user's desire for this accelerated scan process may be communicated in a variety of manners. For example, the GUI 56 may include a "quick-copy" button or a "quick-scan" button which can be pressed or activated by a user and which will cause the controller 44 to initiate the accelerated scan process. In another example, if the user presses or activates a copy or scan button twice, the controller 44 may initiate the accelerated scan process. The GUI 56 may also have an interactive menu through which the quick-copy or quick-scan function can be selected, or the GUI 56 may present the quick-copy or quick-scan function as an option each time a copy or scan is requested.

If desired, various steps may be taken to accommodate the reduced output of the light source 14. These steps may include a determination of the output of the light source 14 at the time of scanning. The output of the light source 14 as an absolute value or as a percentage of its maximum output may be determined at a given time based upon elapsed warmup time given a known warmup curve for a lamp (i.e., utilizing a graph as shown in FIG. 3). Alternatively, the scanning device may have an output sensor (not shown) such that the output of the light source 14 can be tracked. The output sensor may be operatively coupled to the controller 44 to provide the strength of the output of the light source 14 (either as an absolute value or as a percentage of the maximum output of the light source) to the controller 44. However, the use of a light source sensor can add expense and complexity to the system.

In one embodiment, the speed of the relative movement between the light source 14/receptor 18 and the document 20 is adjusted to account for any reduced output of the light source 14. The controller 44 may have a look-up table which provides the speed at which the light source 14/receptor 18 should be moved relative to the document 20 (or vice versa) based upon the output of the light source 14. For example, if the output of the light source 14 is determined to be 60% of its maximum output, then the light source 14/receptor 18 (or document 20) may be moved at 60% of the speed at which it is moved during normal scanning when the light source 14 provides its maximum output. Thus in this case the relative motion of the light source 14/receptor 18 and the document 20 has a direct relation to the output of the light source 14.

Slower relative movement allows reflected light to impinge upon the receptor 18 (i.e., CCD array) for a longer period of time. In this manner the slower relative movement accommodates a relatively low CCD sense window and is analogous to adjusting the shutter on a camera to increase exposure time.

A wide variety of other manners of adjusting the relative speed of the light source 14/receptor 18 relative to the document 20 may be used. In one case the light source 14/receptor 18 or document 20 are movable at a wide variety of speeds. However, to provide greater efficiencies a relatively low number of discrete (i.e. three to five) relative speeds may be selectable. For example, the system 10/controller 44 may be configured such that after 5 seconds of warm up time (from a cold state) of the light source 14, the relative movement of the light source 14/receptor 18 and document 20 is about 30-35% slower than relative movement of the light source 14/receptor 18 and document 20 when the light source 14 is fully warmed up. The relative motion may be 22% slower than the maximum after 9 seconds of warmup, 15% slower than the maximum after 12 seconds of warmup, about 7% slower after 17 seconds of warmup, and full relative speed may be utilized after 24 seconds of warmup. Of course, the percentages and elapsed time may be varied to accommodate the characteristics of the specific light source 14 being used. Furthermore, rather than using a look-up table the controller 44 may utilize an equation or equations to determine the relative speed as a function of the output of the light source 14. If desired, the relative speed may be adjusted (i.e. increased) during a pass or during the scanning process to accommodate further warming of the light source 14 during the pass.

It can be desired to provide a minimum light budget which represents a minimum amount of light that must be received by the receptor 18 for proper functioning of the receptor 18. Because the mechanism system of the scanning device 10 can be set up to move the light source 14/receptor 18 at discrete speeds, the fastest discrete speed which provides the minimum exposure time or light budget for the receptor 18 may be utilized in the scanning operation. Accordingly, when the relative movement between the light source 14/receptor 18 is set at various discrete levels, a direct linear relationship between the output of the light source 14 and the relative motion may not be feasible.

Furthermore, rather than merely tracking the "warm-up" status of the light source 14 from a cold state, the output of the light source 14 can be estimated by tracking the history of activity of the light source 14. For example, if the light source 14 has been activated for a relatively long period of time, and then turned off for a relatively short period of time, when the light source 14 is re-activated, a full warm-up time may not be required. Thus the controller 44 may also store a set of cooling-off data or charts which provide the initial output of the light source 14 when the light source 14 has been inactivated for various periods of time. This data may also take into account the output of the light source 14 at the time it was switched off. Thus, the term "warm up time" may include the time that the light source 14 has been activated as measured from when the light source 14 was in a fully cold state, and/or as measured from when the light source 14 was most recently activated.

The output or performance curve of the light source 14 may be dynamically adjusted to account for changes in performance of the light source 14 over time. For example, performance of most light sources 14 degrades over time as a function of "power-on" hours, and therefore the scanner 10 and/or controller 44 may be configured to accommodate reduced output of the light source 14. The effective life of a lamp or light source 14 is typically specified in the number of power-on hours of the light source until the maximum output of the light source is equal to about 50% of the initial maximum output of the light source. Thus, for example, if a light source is specified to have a life of 15,000 hours, then the amount of light emitted at its maximum output after 15,000 hours of service is half of the maximum light output of the light source at its initial use.

The controller 44 may track the number of hours that a light source has been used (i.e. the power-on hours) and adjust the output curve or output performance of the light source to accommodate reduced output of the light source over time. This usage information can be logged using, for example, a non-volatile RAM on the controller. Thus, for example, a plurality of plots of output vs. time, depending upon usage of the light source, may be stored, as shown in FIG. 3. Plots for a new lamp, a lamp at 50% of its effective life, and a lamp at 25% of its effective life are shown in FIG. 3. Of course, a wide variety of plots at various stages of life for the lamp may be utilized.

Accordingly, taking into consideration the performance degradation of the light source 14 over time, the required warm-up time may be extended and/or the relative speed between the document 20 and light source 14/receptor 18 may be reduced to accommodate reduced output of the light source 14 over time. If the system 10 does not include a light source sensor or detector, the determination of reduced output of the light source is an open loop system which provides only an estimate of the reduced output of the light source over time. However, with sufficient data samples, the degradation of the light source over time may be able to be relatively accurately determined. Furthermore, the accommodation of the reduced output of the light source over time may be used during all scanning processes and not just during the "quick" copy wherein accelerated copying at less than maximum output of the light source is utilized.

Instead of adjusting the relative speed between the document 20 and light source 14/receptor 18, the output of the receptor 18 may be modified to accommodate the reduced output of the light source 14. For example, the controller 44 may store a set of data performance curves or tables for the light source 14. When scanning occurs while the light source 14 is not fully warmed up, the output of the light source 14 may be estimated based upon the elapsed warm up time of the light source 14. In this manner the controller 44 can estimate the output of the light source, including its magnitude and spectrum (i.e. the light distribution at various wavelengths).

Knowing the (estimated) output of the light source 14, the output of the receptor 18 can be modified to accommodate the reduced output. For example, if it is known that the output of the light source 14 is only about 80% of the maximum output at the time of scanning, then the output of the receptor 18 may be extrapolated to produce data values which estimate the qualities of the document 20 when exposed to the maximum output of the light source 14. The output of the receptor 18 may be modified based upon the performance tables described above, while at the same time adjusting the speed of relative movement between the document 20 and light source 14/receptor 18.

Furthermore, because the spectrum of the light source 14 is known, various color-specific adjustments may be included in the adjustment to the receptor 18 output. For example, output curves (similar to that shown in FIG. 3) may be maintained for blue, green, and red light as emitted by the light source 14. Thus, if it is known that the output of blue light from the light source 14 lags behind the other colors of light at reduced output levels, the output of the receptor 18 can be adjusted, for example, by boosting the blue output of the receptor based upon extrapolation.

Having described the invention in detail and by reference to the preferred embodiments, it will be apparent that modifications and variations thereof are possible without departing from the scope of the invention.

What is claimed is:

1. A scanning device comprising:

a controller;

a light source operatively coupled to said controller, said light source being shaped and located such that at least part of the light emitted from said light source is reflected off of a document to be scanned, said light source having a maximum output when said light source is fully warmed up; and a receptor operatively coupled to said controller, said receptor being located to receive said light reflected from said document to be scanned such that said at least part of the visual properties of said document to be scanned are transmitted to said receptor in a scanning process, wherein said controller is configured to selectively allow said scanning process to proceed when an output of said light source is more than 50% and is less than about 80% of said maximum output due to an operating condition of the light source.

2. The scanning device of claim 1 wherein said scanning device is configured to cause relative movement between said document to be scanned and said light source during said scanning process.

3. The scanning device of claim 2 wherein said controller is configured to determine the output of said light source and to control the speed of the relative movement between said light source and said document based upon the output of said light source.

4. The scanning device of claim 3 wherein said controller is configured to determine the output of said light source based at least in part upon the elapsed warm up time of the light source.

5. The scanning device of claim 2 wherein the speed of said relative movement is directly related to said output of said light source.

6. The scanning device of claim 2 wherein said document to be scanned and said light source are movable relative to each other at a plurality of discrete speeds, and wherein said receptor has a light budget which represents a minimum amount of light that must be received by said receptor for proper functioning of said receptor, and wherein relative movement during said scanning process is the fastest of said plurality of discrete speeds which allows said light budget to be met during said scanning process.

7. The scanning device of claim 1 wherein said controller is configured to process an output generated by said receptor to accommodate any reduced output of said light source.

8. The method of claim 7, wherein the processing of the output of said receptor comprises extrapolating the output to generate data values estimating at least one quality of the document when exposed to the maximum output of the light source.

9. The method of claim 7, wherein the processing of the output of said receptor comprises performing a color-specific adjustment of the output of the receptor.

10. The scanning device of claim 1 wherein said receptor is configured to process said received reflected light to create an electronic version of said document to be scanned.

11. The scanning device of claim 10 wherein said electronic version of said scanned document is processable by or storable in said controller.

12. The scanning device of claim 10 wherein said light source and said receptor are part of a CCD scanner.

13. The scanning device of claim 1, in wherein said receptor includes a photoconductive body.

14. The scanning device of claim 1 wherein said light source includes a plurality of lamps.

15. The scanning device of claim 1 wherein said light source has an on status and an off status, and wherein when said light source is switched from said off status to said on status after residing in said off status for a sufficient period of time, an output of said light source is significantly lower than said maximum output, and wherein said light source output increases towards said maximum output as time elapses and said light source remains in said on status.

16. The scanning device of claim 1 wherein said controller is configured to allow said scanning process when an output of said light source is more than 50% and is less than about 80% of said maximum output only when said controller receives a predetermined user input.

17. The scanning device of claim 16 further comprising an input unit which can receive user input indicating a desire for accelerated scanning of said document, said input unit being operatively coupled to said controller such that user manipulation of said input unit in a predetermined manner causes said input unit to send said predetermined user input to said controller.

18. The scanning device of claim 1 wherein said device includes print means for printing a copy of said scanned document.

19. The scanning device of claim 1 wherein said controller is configured to determine the output of said light source based at least in part upon the elapsed warm up time of the light source.

20. The scanning device of claim 1 wherein said controller is configured to determine the output of said light source based at least in part upon the total elapsed power-on hours of said light source.

21. The method of claim 1, wherein the controller determined the output of the light source based upon prior use of the light source.

22. The method of claim 21, wherein determination of the output of the light source is based upon a number of hours of prior use of the light source.

23. The method of claim 21, wherein determination if the output of the light source is based upon use of the light source within a predetermined period of time immediately prior to being used to scan the document.

24. The method of claim 1, wherein the controller modifies a warm up time of the light source to performing the scanning process based upon prior use of the light source.

25. The method of claim 24, wherein the warm up time is based upon prior use of the light source immediately prior to scanning the document.

26. The method of claim 24, wherein the warm up time is based upon a number of hours of prior use of the light source.

27. A method for scanning a document comprising the steps of:

providing a scanning device including a receptor and a light source having a maximum output when said light source is fully warmed up; and causing said light source to emit light and reflect at least part of said emitted light off of a document to be scanned such that said light reflected from said document is transmitted to said receptor such that said at least part of the visual properties of said document are transmitted to said receptor in a scanning process, and wherein said causing step is initiated such that at least part of said scanning process is carried out when an output of said light source is greater than 0% and less than about 80% of said maximum output due to an operating condition of the light source, the method of scanning further comprising delaying scanning of the document by a warm up period, the warm up period being based upon prior use of the light source.

28. The method of claim 27, further comprising:

determining, prior to causing, the output of the light source based upon prior use thereof.

29. The method of claim 28, wherein the prior use of the light source comprises use of the light source immediately prior to the causing.

30. The method of claim 28, wherein the determining comprises determining a number of hours of prior use of the light source.

31. The method of claim 27, further comprising, prior to scanning the document, receiving user input indicating a desire for accelerated scanning of the document.

32. A method for scanning a document comprising the steps of:

providing a scanning device including a receptor and a light source having a maximum output when said light source is fully warmed up;

determining the output of said light source based at least in part upon prior use of the light source;

causing said light source to emit light and reflect at least part of said emitted light off of a document to be scanned such that said light reflected from said document is transmitted to said receptor such that said at least part of the visual properties of said document are transmitted to said receptor; and maintaining in memory data performance curves of the light source as function of different amounts of prior use, the data performance curves being used in determining the output of the light source.

33. The method of claim 32, wherein the prior use comprises substantially immediately prior use of the light source relative to scanning the document.

34. The method of claim 32, wherein the prior use comprises use of the light source throughout the lifetime thereof.

35. The method of claim 32, further comprising delaying scanning the document by a time period that is based upon prior use of the light source.

36. The method of claim 32, further comprising receiving user input indicating a desire for accelerated scanning of the document, prior to determining the output of the light source.

37. A method for scanning a document comprising:

providing a scanning device including a receptor and a light source having a maximum output when said light source is fully warmed up;

causing said light source to emit light and reflect at least part of said emitted light off of a document to be scanned such that said light reflected from said document is transmitted to said receptor such that said at least part of the visual properties of said document are transmitted to said receptor in a scanning process, and wherein said causing step is initiated such that at least part of said scanning process is carried out when an output of said light source is greater than 0% and less than about 80% of said maximum output due to an operating condition of the light source;

determining, prior to causing, the output of the light source based upon prior use thereof; and storing data performance curves of the light source, each data performance curve being a function of a different amount of prior use, the curves being used in determining the output of the light source.

38. A method for scanning a document comprising:

providing a scanning device including a receptor and a light source having a maximum output when said light source is fully warmed up;

causing said light source to emit light and reflect at least part of said emitted light off of a document to be scanned such that said light reflected from said document is transmitted to said receptor such that said at least part of the visual properties of said document are transmitted to said receptor in a scanning process, and wherein said causing step is initiated such that at least part of said scanning process is carried out when an output of said light source is greater than 0% and less than about 80% of said maximum output due to an operating condition of the light source; and post-processing output of the receptor to reflect a reduced amount of light emitted by the light source.

39. The method of claim 38, wherein the post processing comprises extrapolating the output of the receptor.

40. The method of claim 38, wherein the post-processing comprises performing a color-specific adjustment of the output of the receptor.

* * * * *